(12) United States Patent
Etzenbach

(10) Patent No.: US 8,083,395 B2
(45) Date of Patent: Dec. 27, 2011

(54) DEVICE AND METHOD FOR ADMIXING LIQUIDS INTO FLOWABLE BULK MATERIAL

(75) Inventor: Joachim Etzenbach, Georgsmarienhütte (DE)

(73) Assignee: DIOSNA Dierks & Söhne GmbH, Osnabrück (DE)

( * ) Notice: Subject to any disclaimer, the term of this patent is extended or adjusted under 35 U.S.C. 154(b) by 1047 days.

(21) Appl. No.: 11/955,413

(22) Filed: Dec. 13, 2007

(65) Prior Publication Data

US 2008/0144425 A1 Jun. 19, 2008

(30) Foreign Application Priority Data

Dec. 14, 2006 (DE) .................... 10 2006 059 051

(51) Int. Cl.
*B01F 15/02* (2006.01)
*B01F 3/12* (2006.01)
(52) U.S. Cl. ............... 366/137.1; 366/167.1; 366/178.1; 366/181.1
(58) Field of Classification Search .............. 366/173.2, 366/167.1, 167.2, 137.1, 178.1, 181.1
See application file for complete search history.

(56) References Cited

U.S. PATENT DOCUMENTS

| | | | | | |
|---|---|---|---|---|---|
| 1,629,200 A | * | 5/1927 | Buhtz | ............................ | 366/145 |
| 1,741,176 A | * | 12/1929 | Wilder | ........................ | 366/170.4 |
| 1,855,548 A | * | 4/1932 | Forster | ........................ | 366/167.2 |
| 2,071,846 A | * | 2/1937 | Lamb et al. | .................... | 118/303 |
| 2,282,662 A | * | 5/1942 | Lindsey | ............................ | 62/71 |
| 2,389,084 A | * | 11/1945 | Routh | ........................ | 366/169.2 |
| 2,868,516 A | * | 1/1959 | Moseley | ..................... | 366/176.2 |
| 3,158,358 A | * | 11/1964 | Fischer | ........................ | 366/169.1 |
| 3,773,299 A | * | 11/1973 | Rebish | ........................ | 366/167.2 |
| 3,850,413 A | * | 11/1974 | Rebish | ........................... | 366/341 |
| 3,881,703 A | * | 5/1975 | Rebish | ........................ | 366/167.2 |
| 3,887,166 A | * | 6/1975 | Van Ginneken | ........... | 366/177.1 |
| 3,912,231 A | * | 10/1975 | Weber | ........................ | 366/172.2 |
| 3,920,225 A | * | 11/1975 | Lee et al. | .................... | 366/170.4 |
| 3,986,705 A | * | 10/1976 | Nauta | ........................ | 366/170.4 |
| 4,116,163 A | * | 9/1978 | Torelli et al. | ................... | 118/303 |
| 4,323,314 A | | 4/1982 | Kaiser-Wirz | | |
| 4,453,832 A | * | 6/1984 | Schumacher et al. | ...... | 366/171.1 |
| 4,491,608 A | | 1/1985 | Thygesen | | |
| 4,628,807 A | * | 12/1986 | Dopp | .............................. | 99/488 |
| 4,688,945 A | * | 8/1987 | Brazelton et al. | ........... | 366/156.1 |
| 4,689,249 A | * | 8/1987 | Thygesen | ..................... | 427/180 |

(Continued)

FOREIGN PATENT DOCUMENTS

DE 202004018807 U1 4/2005

(Continued)

*Primary Examiner* — Tony G Soohoo
(74) *Attorney, Agent, or Firm* — Gudrun E. Huckett

(57) ABSTRACT

A device for admixing a liquid into flowable dry materials has a housing with a mixing chamber having an inner wall with an impact area and an exit opening at a bottom end of the mixing chamber. Dry material is supplied from above into the mixing chamber and falls downwardly toward the impact area in front of the inner wall of the mixing chamber and exits through the exit opening. A nozzle generates a pressurized high-speed jet of a liquid impacting on the inner wall of the mixing chamber in the impact area and wetting the dry material with the liquid as the jet passes through the dry material and impacts against the inner wall. An opening inside the housing is provided for supplying liquid and pasty additives, wherein the opening is directed toward an area of the mixing chamber between the nozzle and the impact area.

15 Claims, 1 Drawing Sheet

U.S. PATENT DOCUMENTS

| | | | |
|---|---|---|---|
| 4,810,099 A * | 3/1989 | Langsetmo et al. | 366/168.1 |
| 4,838,703 A * | 6/1989 | McMaster et al. | 366/168.2 |
| 5,073,032 A * | 12/1991 | Berion et al. | 366/137.1 |
| 5,488,898 A * | 2/1996 | Hough | 99/516 |
| 5,891,246 A * | 4/1999 | Lund | 118/13 |
| 6,481,885 B2 * | 11/2002 | Dupre | 366/137 |
| 6,749,330 B2 * | 6/2004 | Allen | 366/136 |

FOREIGN PATENT DOCUMENTS

EP    1932427    *  6/2008

* cited by examiner

DEVICE AND METHOD FOR ADMIXING LIQUIDS INTO FLOWABLE BULK MATERIAL

BACKGROUND OF THE INVENTION

The invention relates to a device and a method for admixing liquids into flowable dry bulk material, in particular, flour for producing dough for baking, wherein in a mixing chamber that is positioned slantedly, in particular vertically, dry materials supplied from above and failing downwardly toward an impact area in front of an inner wall of the mixing chamber are wetted by a liquid in the form of a pressurized high-speed jet from at least one nozzle with impact against the inner wall and fall to an exit opening positioned below.

New developments in particular in the area of preparing dough for baking have shown that the admixture of liquid into dry materials, for example, the admixture of water into flour when preparing dough for baking, can be accelerated, shortened and also reduced machine-technologically in that the individual components are no longer mixed with mechanical mixing tools and homogenized as a dough but that mixing, blending, and kneading processes can be shortened significantly by a hydro-mechanical action of the liquid onto the dry material in that a high-pressure liquid jet (or several thereof) is continuously introduced onto a layer of the dry material that passes through an impact area in front of an inner wall of the mixing container. Such a device is disclosed in DE 20 2004 018 807 U1. A cylindrical mixing container having a centrally arranged rotating mixing nozzle is disclosed whose liquid jet is oriented at a slant downwardly onto an inner mixing chamber wall and acts in an impact area on the dry material failing down in front of the inner wall of the mixing chamber.

In connection with admixture it is important that the nozzle is supplied only with a suitable liquid that prevents soiling or plugging. On the other hand, an excellent and uniform distribution and flowability of the dry material are important for its supply. Also, the material flow of the materials after liquid and dry material have been combined is often prone to disturbances. However, in many cases it is required that not only liquids suitable for distribution by nozzles and flowable dry materials are to be mixed. In particular, there are liquid or paste-like additives that can neither be added via nozzles nor by a supply device designed for dry material. Introduction of such materials is realized in DE 20 2004 018 807 U1 from the exterior through the inner wall of the mixing chamber, for which purpose in particular slot-shaped wall openings in the mixing chamber and annular distributors are provided.

SUMMARY OF THE INVENTION

It is an object of the present invention to simplify the introduction of additives and to introduce the additives intensively with the admixture of the liquid into the dry materials and, in this connection, to utilize the special possibilities of a pressurized jet admixture also for the additives.

In accordance with the present invention, this object is achieved for a device of the aforementioned kind in that an opening for liquid and pasty additives is provided which opening is directed toward an area of the mixing chamber between the nozzle and the impact area. This object is further solved for a method of the aforementioned kind in that in the area of the pressurized jet between nozzle and impact area liquid or pasty additives are introduced.

By introducing the additives in the active area of the pressurized jet between nozzle and impact area these additives are entrained by the pressurized jet and are admixed at high energy into the dry materials without risking the disadvantages to be expected in connection with such materials with regard to soiling and plugging of the nozzle or nozzles. It has been surprisingly found that high speed liquid jets remain effective in regard to mixing even when they impact on supplied additives before they reach the impact area.

Of course, the supply of additives can be realized in a jet shape horizontally or at an incline. Preferably, however the additives are introduced so as to fall under the effect of gravity. The pressurized jets to be provided for entraining the additives can be, for example, linearly stretched wide jets that cover a corresponding width of an impact area. However, movable nozzles can be used advantageously with regard to a beneficial jet shape, e.g. having round nozzle openings, that are to be utilized for covering a larger working width in a pendulous or rotating way.

In particular for a device that is designed with a rotary configuration, within a substantially cylindrical inner wall of the mixing chamber dry materials can be supplied along the inner wall of the mixing chamber from above while a curtain of additives will drop in front of it in order to have a quickly rotating liquid jet penetrate both and thereby admix them.

Such an embodiment can be used successfully not only in connection with producing doughs for baking that, because of processing of flour, water and special additives, are subject to especially critical processing conditions and must fulfill particularly high demands with regard to the work product. It has been found in this connection, that this admixture leads to high-yield dough and excellent quality.

BRIEF DESCRIPTION OF THE DRAWINGS

One embodiment of the invention is illustrated in the drawing FIG. 1 and will be explained in the following in more detail. The only figure of the drawing shows a schematic vertical longitudinal section of the mixing device according to the invention.

DESCRIPTION OF PREFERRED EMBODIMENTS

Figure 1:
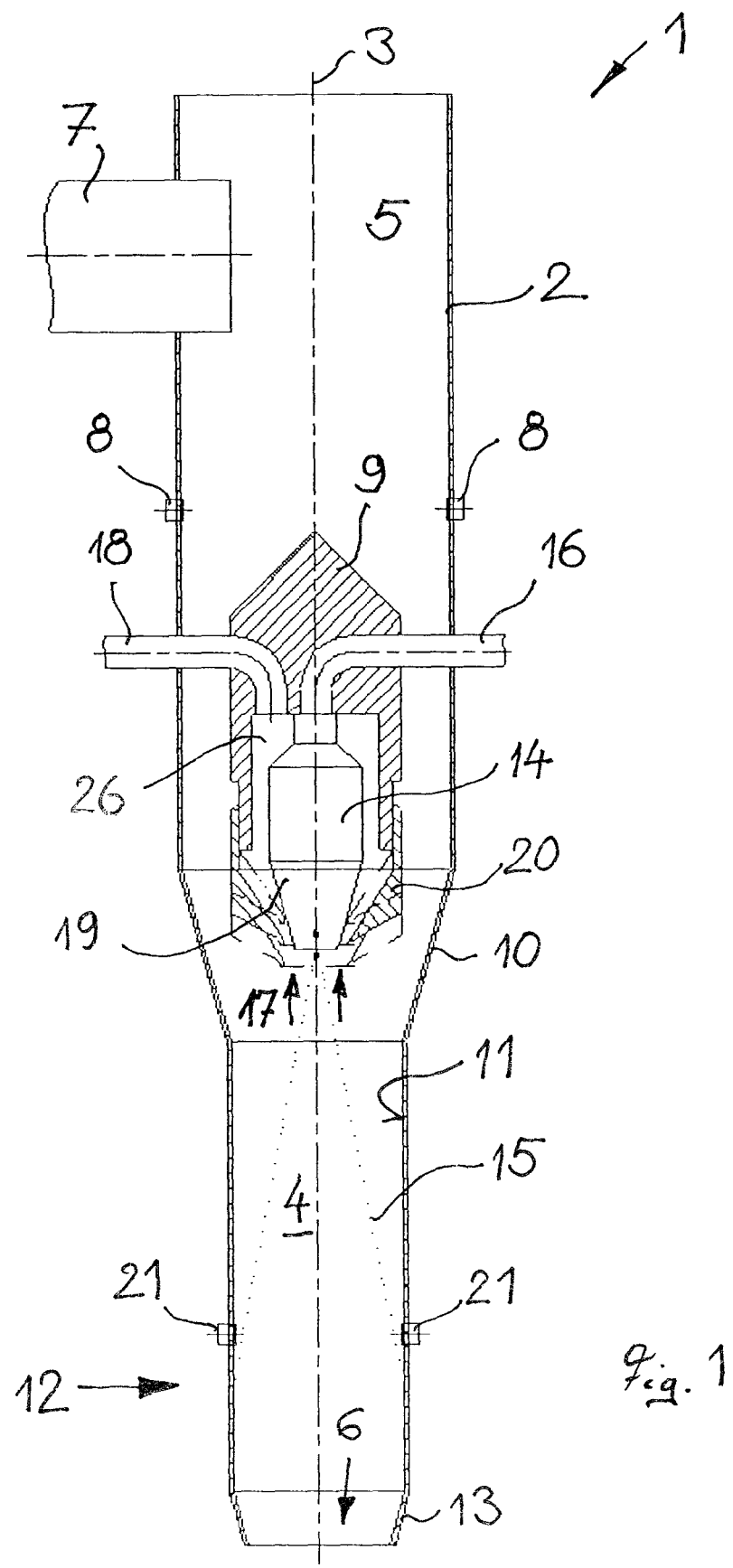

The device referenced in the drawing with reference numeral 1 for admixing a liquid into flowable dry materials, in particular for the purpose of producing dough for baking, has a substantially cylindrical housing 2 with a vertical center axis 3; the lower section of the housing surrounds a mixing chamber 4. At the top, a filling chamber 5 for dry materials is provided (in this embodiment, flour for the preparation of dough for baking) and is open in the upward direction and also in the downward direction toward an exit opening 6 for enabling free flow of the dry materials. A lateral socket-shaped supply 7 is provided for feeding in dry material.

Compressed air inlets 8 can be provided as needed for loosening and making fluid the dry materials when there is the risk that the dry material clumps together or compacts easily. In the downward direction, the dry materials flow within the housing past a central distribution body 9 and then follow closely the housing contour in the area of the downwardly conically tapering step 10 of the housing 2 and glide downwardly along the wall in the area upstream of the inner wall 11 of the mixing chamber to an impact area 12 where they are mixed with liquid. The housing that is cylindrical in this area becomes more narrow in an end stage 13 that is slightly conically tapered in order to make the material flow more uniformly and to enhance the admixing action.

The distribution body 9 is arranged centrally in the housing 2 and is provided with an upwardly pointing cone tip from where the dry materials can glide downwardly. As a hollow body, it surrounds a rotary nozzle 14 that generates a circumferentially revolving jet that is axially symmetrical and oriented at a slant downwardly and outwardly toward the impact area 12 against the inner wall 11. The concentrated jet that exits at high speed introduces a nozzle-suitable liquid such as water, yeast water or the like at high speed in the impact area 12 into the dry material that falls like a curtain along the inner wall 11 and achieves in this way an intensive, quick, and intimate admixture.

The rotary nozzle 14 in the present case is a conventional part that comprises in the interior a freely rotating nozzle body, not illustrated, that rotates when liquid is being supplied tangentially and in this way provides the desired movement sequence producing the liquid cone 15. It is however understood that the nozzle can also be moved by means of a separate rotary drive in order to control the rotational speed more closely. The rotary nozzle 14 is supplied through liquid supply line 16 with liquid at high pressure; this ensures the required jet at high speed.

The nozzle 14 is surrounded by an annular chamber 26 that in the downward direction passes into an annular opening 17 extending about the nozzle 14. This annular chamber is supplied through supply line 18 that passes, like the supply line 16, through the distribution body 9 in order to discharge at the opening 17 additives that should neither be added to the liquid ejected by the nozzle 14 nor the dry material that is failing externally. In particular, these additives are liquid or pasty. However, flowable additives can also be used in this context that should not be added or admixed prematurely to the dry materials. The additives that exit at the opening 17 in the downward direction reach the liquid cone 15 between nozzle 14 and impact area 12, i.e., they are subjected to the action of the rotating jet and are entrained by the jet toward the dry material that falls along the inner wall 11 and are simultaneously admixed with the liquid and the dry materials. The energy of the jet is to be selected so high that entraining of such additives ensures the admixture of the liquid into the dry materials.

For more precise metering of the additives with regard to the quantity and viscosity, the annular opening 17 is adjustable with regard to its width. In this connection, the bottom side of the rotary nozzle 14 is provided on the one hand with a downwardly tapering truncated cone-shaped nozzle housing 19 that defines the opening 17 inwardly. The distribution body 9 is formed at the bottom side by a cup-shaped jacket 20 that is open at the lower end at its center and that is telescopingly slidable in the axial direction and cooperates with the remaining distribution body 9. Axial displacement of the jacket 20 relative to the conical part 19 of the nozzle housing changes the width of the opening 17.

In this way, it is possible to mix, at high hydraulic energy in a uniform continuously working mixing chamber system, dry and liquid materials as well as liquid and/or pasty additives that neither appear to be suitable for passing through as a dry additive nor for being introduced through a nozzle. The admixture is adjustable with regard to all components and is realized in a flow-through method quickly and effectively.

The conveyance of the obtained mixture out of the impact area is realized by gravity and also under the effect of the jet wherein the terminal stage 13 was found to be advantageous for affecting the drainage speed as well as for providing additional admixture. In the impact area, preferably above the conical jet area 15, there are additional nozzles (liquid inlets) 21 distributed in the circumferential direction within the housing in order to inject, as needed, further liquid additives, to provide wetting of the failing dry materials from the exterior, and to reduce, if needed, the adhesion effects of the wetted materials on the wall.

It is understood that the size of the device parts are to be selected in accordance with the materials to be processed, the desired throughput and also the desired qualities. In this regard, in particular in the case of producing dough for baking, it is advantageous when the diameter of the mixing chamber is reduced relative to the remaining part of the housing. Also, a slim cone angle of the cone 15 relative to the central axis 3 of less than 20 degrees, preferably 10 degrees, is advantageous in order to obtain a sufficient impact energy on the dry materials and the inner wall 11, while on the other hand also a conveying push for throughput in the downward direction is achieved.

In the case of producing dough for baking, the dry materials can be flour as well as other pre-made mixes. By means of the high pressure connector 16 the nozzle can be supplied with water as well as yeast solutions. With regard to other liquids it is primarily important that the function of the nozzle will not be impaired by contaminants or deposits.

The additives can vary within a wide range. Sponges as well as sourdough or pre-mixed materials can be used. It is also possible to introduce liquid solutions such as sugar solutions, salt solutions, yeast solutions, oils or fat through the opening 17.

The specification incorporates by reference the entire disclosure of German priority document 10 2006 059 051.1 having a filing date of Dec. 14, 2006.

While specific embodiments of the invention have been shown and described in detail to illustrate the inventive principles, it will be understood that the invention may be embodied otherwise without departing from such principles.

What is claimed is:

1. A device for admixing a liquid into flowable dry materials, the device comprising:
 a housing comprising a mixing chamber having an inner wall with an impact area and an exit opening at a bottom end of the mixing chamber, wherein dry material supplied from above into the mixing chamber falls downwardly toward the impact area in front of the inner wall of the mixing chamber and exits through the exit opening;
 at least one nozzle disposed in the housing above the mixing chamber and having a nozzle opening facing the exit opening, wherein the at least one nozzle generates a pressurized high-speed jet of a liquid directed downwardly and impacting on the inner wall of the mixing chamber in the impact area and wetting the dry material with the liquid as the jet passes through the dry material and impacts against the inner wall;
 a jacket disposed inside the housing and surrounding the at least one nozzle such that an annular opening is defined between an outer wall of the at least one nozzle and an inner wall of the jacket, wherein the annular opening is provided for supplying liquid and pasty additives and is directed downwardly toward an area of the mixing chamber between the at least one nozzle and the impact area.

2. The device according to claim 1, wherein the impact area extends along the inner wall and the annular opening has an elongate shape.

3. The device according to claim 2, wherein the at least one nozzle is a rotary nozzle oriented toward the impact area that is annular.

4. The device according to claim 1, wherein the annular opening has a width that is adjustable by moving the jacket relative to the nozzle housing.

5. The device according to claim 4, wherein the at least one nozzle has a nozzle housing and the nozzle housing delimits radially inwardly the annular opening.

6. The device according to claim 5, wherein the nozzle housing is conical in the area of the annular opening.

7. The device according to claim 6, wherein the jacket is slidably arranged on a distribution body provided in the housing so as to be movably in a n axial direction of the jacket relative to the nozzle housing.

8. The device according to claim 3, comprising a distribution body in which the at least one nozzle is arranged, wherein the distribution body has a bottom side and the at least one nozzle opening and the annular opening for supplying liquid and pasty additives are provided at the bottom side.

9. The device according to claim 8, wherein the distribution body and the inner wall of the mixing chamber delimit an annular opening for the dry material.

10. The device according to claim 9, further comprising a filling chamber above the distribution body.

11. The device according to claim 10, wherein at least one compressed air inlet is provided in the filling chamber.

12. The device according to claim 1, wherein the mixing chamber is provided with at least one liquid inlet near the impact area.

13. A method for admixing a liquid into flowable dry materials, the method comprising the steps of:
supplying dry material from above into a mixing chamber having an inner wall with an impact area so that the dry material falls downwardly toward the impact area in front of the inner wall of the mixing chamber and exits from the mixing chamber through an exit opening positioned below the mixing chamber;
supplying a liquid in theform of a pressurized high-speed jet from at least one nozzle with a nozzle opening facing the exit opening, wherein the jet forms a liquid cone that widens downwardly and away from the nozzle opening in a direction toward the impact area of the inner wall and wets the dry material with the liquid;
introducing through an annular opening surrounding the nozzle opening additives that are liquid or pasty into the liquid cone in an area between the nozzle opening and the impact area.

14. The method according to claim 13, wherein the additives are added above the impact area.

15. The method according to claim 13, wherein, in the step of introducing, the additives are supplied in the form of an annular curtain about the at least one nozzle that is a rotary nozzle.

* * * * *